July 10, 1923.

J. REECE

VARIABLE SPEED TRANSMISSION

Filed March 11, 1920      4 Sheets-Sheet 1

1,461,556

Inventor.
John Reece
by Rogers, Kennedy & Campbell,
Attys.

July 10, 1923.

J. REECE 1,461,556

VARIABLE SPEED TRANSMISSION

Filed March 11, 1920

Inventor.
John Reece
by Rogers, Kennedy & Campbell,
Attys.

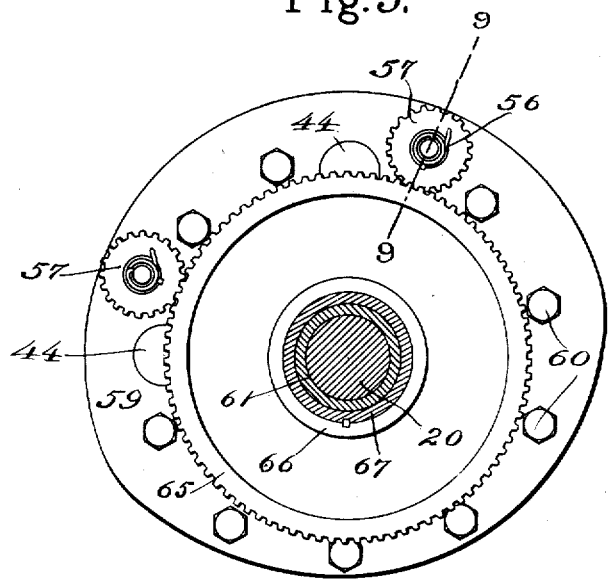
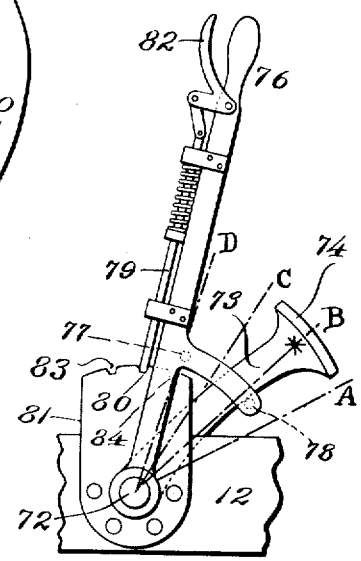
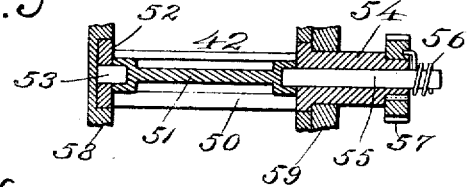
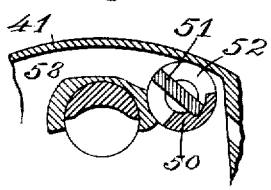
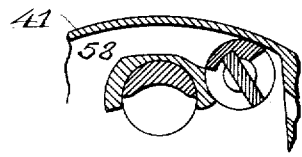
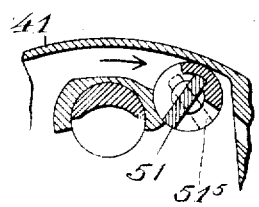

Patented July 10, 1923.

1,461,556

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

VARIABLE-SPEED TRANSMISSION.

Application filed March 11, 1920. Serial No. 364,897.

*To all whom it may concern:*

Be it known that I, JOHN REECE, a citizen of the United States, residing at Boston, in the county of Suffolk and State of Massachusetts, have invented certain new and useful Improvements in Variable-Speed Transmission, of which the following is a specification, reference being had therein to the accompanying drawing.

This invention is a novel variable speed transmission adapted to use in various situations and for various purposes, for example, as a part of the power transmission mechanism of motor vehicles.

The general object is to provide an improved variable speed transmission for motor vehicles, and more especially to afford a mechanism by which the speed ratio between the engine and the driven parts may be regulated preferably semi-automatically to any desired point between the maximum and minimum. By semi-automatically we mean that once the control lever or pedal of the present invention is positioned for either forward or reverse driving, all future speeds may be regulated by merely opening or closing the throttle of the engine. However, it is further true that changes of speed ratio are available with my invention by intermediate adjustment of the parts of the transmission independent of throttle control, and in some cases the throttle control might therefore be dispensed with. My semi-automatic action becomes, when the parts are adjusted, wholly automatic, so that when a greater torque is required by the driven shaft than the engine is capable of transmitting, the speed ratio will be automatically reduced and the torque increased without any further operation on the part of the operator.

Other objects are to afford a mechanism in which, when running at full or normal speed, by which I mean under unit ratio, there will be required no internal motion or change of relation of the parts; also to give quietness and smoothness of action; to avoid the transmission from the engine to the driven parts of vibratory action in the engine; and to afford a simple and effective means of reversing the drive. Also it is an object to afford a transmission mechanism which can be utilized as a brake for retarding the vehicle or machine being driven; also one which will permit free running when set for either forward or reverse drive, for example, when it is desired to allow the car to run freely on a down grade, this being purely automatic in regard to the present invention. Other objects and advantages of the invention will be made clear in the hereinafter following description of one form or embodiment thereof, or will be obvious to those skilled in the art.

To the attainment of the objects and advantages mentioned, the present invention consists in the novel variable speed transmission and the novel features of combination, arrangement, mechanism, design, detail and method herein described or claimed.

Preliminarily it may be stated that my invention involves, in addition to the driving member, and the eventual driven member or shaft, an intermediate rotatable member which is connected in the manner to be described with both the driving and driven members. Associated with the intermediate rotatable member or between it and the driven shaft I introduce an elastic or spring connection, which is capable of acting as a reservoir of energy, such that a certain amount of irregularity or intermittency of motion or action in the intermediate member is permitted without materially affecting the steadiness of rotation of the driven shaft, but maintaining a substantially uniform force or torque thereupon. I also provide a certain yielding connection between the driving member and the intermediate member. This is a device of such nature and so arranged with relation to the driving and intermediate members, that at one part of the rotation or cycle of action the driving member, operating through the yielding device, urges forward the intermediate member, whereas at another period or stage of the action, and while the intermediate member is substantially stationary or anchored, the yielding member, reasserting itself, applies its energy to a forward impulse on the driving member. In combination with these described elements, I employ a means for varying, either purely automatically to meet various road conditions, or at the will of the operator, the action or effect of the yielding connection, operating between the driving and intermediate members, in such a way as to enable the advance of the intermediate member, or rather its average rate of advance, which is irregular, to be increased or diminished. When the ratio is unity, all parts including the intermediate member, rotate together as a unit and without reciprocation or relative change of position. As will be seen, the mechanism is such as to enable free-running, or braking, or reverse driving at will to be effected. Furthermore, when the control lever is positioned for either ahead or reverse driving, the torque is dependent upon the speed of the driving member due to the yielding centrifugal action of the weight or other device carried by same, as will be fully explained. Thus, the operator will control the speed of the machine and also the torque of the driven shaft by merely opening or closing the engine throttle, and in addition, if the torque required on the driven shaft is greater than that which the engine may transmit, the speed ratio will be automatically reduced. Furthermore, as the torque transmitted by the engine is proportionate to the square of the speed of same, it is obvious that on a very low speed of the engine almost no torque will be transmitted and, in consequence, the resistance is negligible and the engine cannot stall.

In the accompanying drawings, Fig. 1 is a top plan view indicating portions of a motor vehicle and a transmission mechanism embodying the principles of the present invention.

Fig. 5 is a similar right elevation partly in section on the line 5—5 of Fig. 3.

Fig. 6 is a cross sectional view of the control valve set for the position of no driving.

Fig. 7 is a similar section of said valve positioned for braking.

Fig. 8 is a similar section of said valve positioned for reverse driving.

Fig. 9 is a sectional view of the control valve on the line 9—9 of Fig. 5.

Fig. 10 is a side elevation of the foot and hand control lever.

Figure 1:
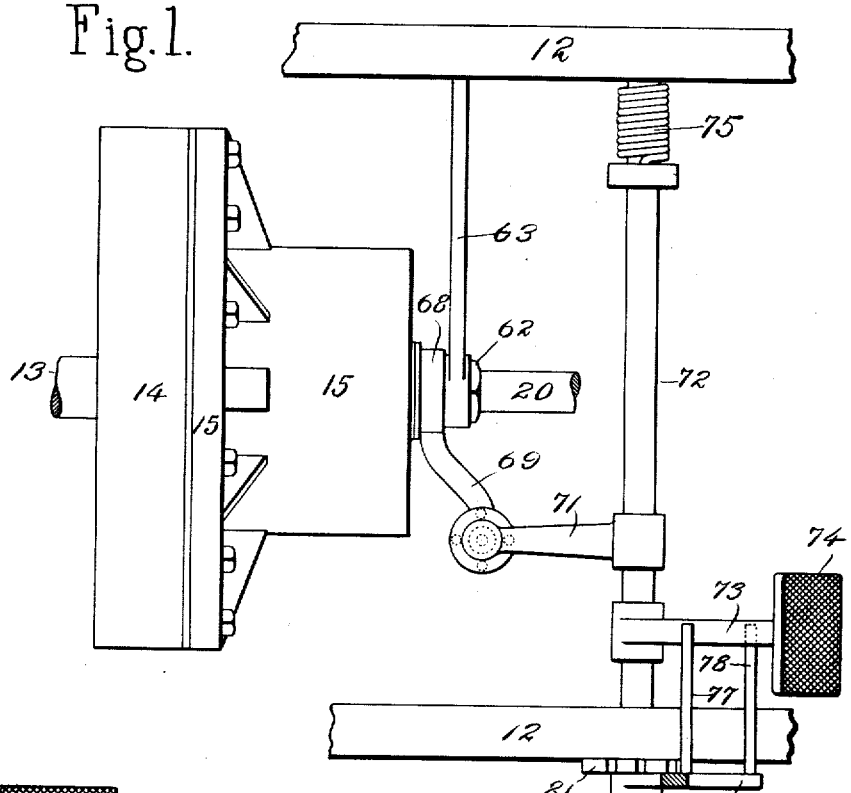
Figure 2:
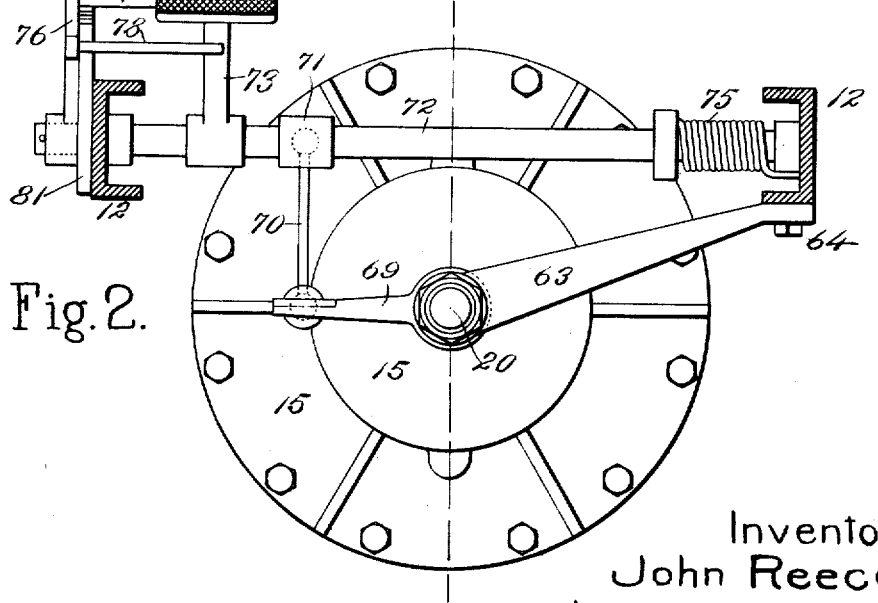
Fig. 2 is a right elevation of the parts shown in Fig. 1.

Referring first to Figs. 1 and 2, there are shown horizontal frame parts 12 of a motor vehicle. The engine shaft 13 is provided with a fly wheel 14, which is a hollow structure and contains, instead of the usual clutch, the mechanism pertaining to this invention, the same being closed by means of a removable cover plate 15, which is extended rearwardly to accommodate said mechanism.

Figure 3:
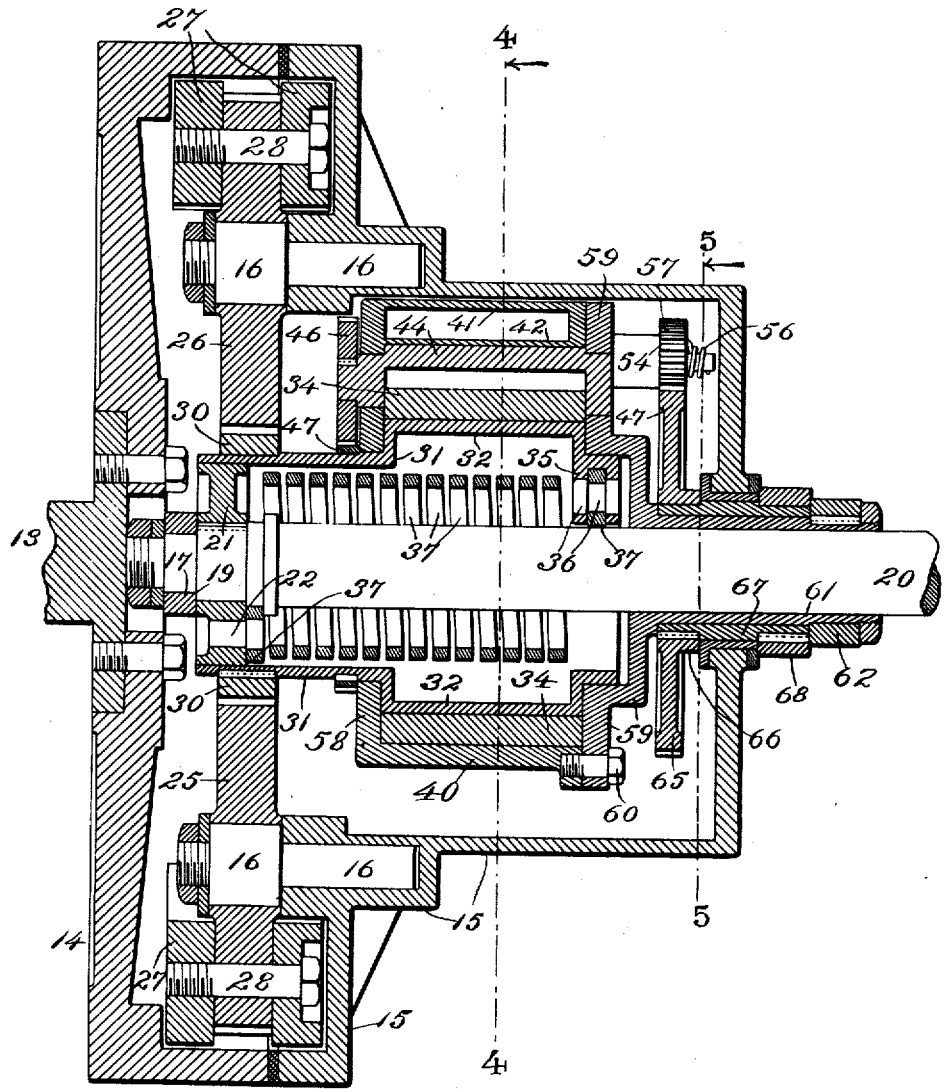
Fig. 3 is a central section taken on the line 3—3 of Figs. 1 and 2.
Figure 4:
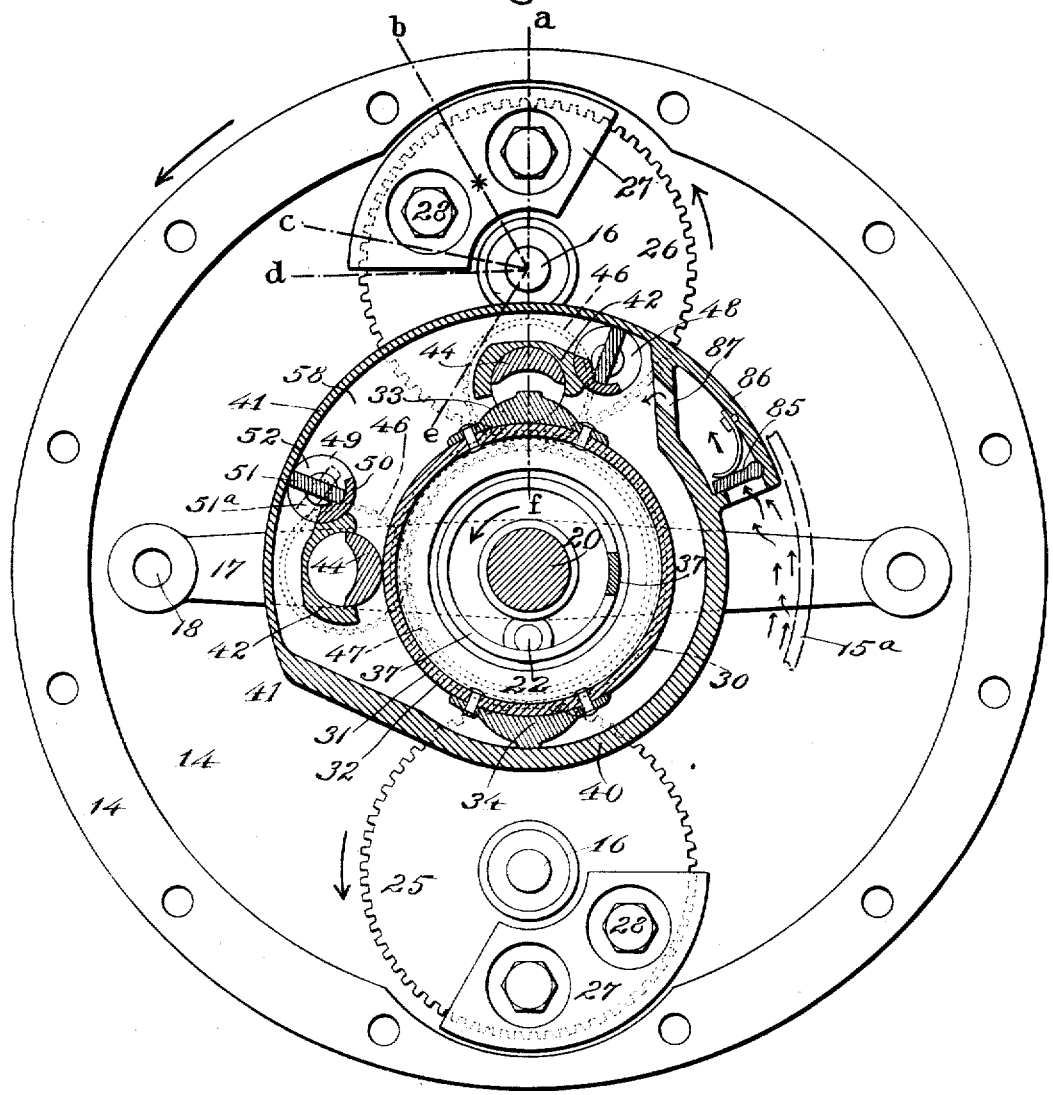
Fig. 4 is a right elevation partly in section on the line 4—4 of Fig. 3, with the cover plate removed to show the interior parts, and the control valve positioned for full ahead driving.

The driving parts of the mechanism comprise the elements 13, 14 and 15, already mentioned, with which may be included a pair of studs or pins 16, interiorly mounted at opposite sides of the cover plate, as seen in Figs. 3 and 4. At right angles to these studs is shown a cross piece 17 supported by studs 18 on the cover plate 15. This cross piece 17 carries the bearing 19 for the driven shaft, later to be described.

The described elements 13 to 19 are constantly rotated by the engine when the latter is in operation, and at the same speed as the engine, which may be uniform under certain conditions, but variable under other conditions, or by the will of the operator.

The driven member is shown in the form of a shaft 20 arranged in alignment with the engine shaft. Mounted rigidly to rotate with the shaft 20 is a disk or collar 21 carrying a pin 22, through which the shaft receives the rotative force, as will be described. At its forward end the shaft turns in a bearing 19 carried by the cover plate. The disk 21 also serves as a forward support or bearing for a piston 31, later to be described. These elements 20, 21 and 22 are the driven parts of the apparatus.

Having described the driving elements and the driven elements, I will next describe certain connections extending from the driving elements to what may be termed an intermediate rotating element, and later the connections from the latter to the driven shaft.

Upon one of the two studs 16 is a rotary gear 25, and upon the other is a similar gear 26. Each of these gears not only rotates about its center or stud 16, but also revolves with the driving parts about the axis of the apparatus, having thus a sort of a planetating motion. They will rotate in unison and their speed will depend upon the speed ratio between the driving and driven shafts.

Each of the planetating gears 25 and 26 carries at its periphery a centrifugal weight 27, secured by bolts 28 upon the gear, and, as seen in Fig. 4, the two weights are correspondingly arranged, so that their actions will be in unison. In passing it may be explained that the centrifugal force of each weight 27 has a tendency first to forcibly retard and then forcibly advance the gear which it carries, as the gear rotates on its stud.

The weights carried by said gears cause no injurious vibration, nor indeed any vibration except so far as they tend to increase and decrease the speed of the fly wheel, and owing to the relatively large weight of said fly wheel the effect is negligible.

A central gear 30 engaging both pinions 25 and 26 is shown, keyed to a member 31, herein called a rotary piston or sleeve, loosely surrounding the bearing disk or collar 21. The gear 30 may be considered as one part of the intermediate element of the apparatus, and the energy of the driving parts is communicated to this gear through the peripherally weighted planetating gears 25 and 26, before mentioned. The transmitted motion is not uniform, but consists of a pulsating action or transmission, as the centrifugal weights move first inwardly, and then outwardly, but this is only when driving at less than unit ratio. The piston 31, which is cylindrical in shape, has its central portion enlarged at 32, and to this part of it are secured or formed opposite lugs or abutments 33 and 34, the purpose and operation of which will be later described. This piston 31, with the above mentioned abutments, constitutes a sort of rotating piston and takes part in a certain hydraulic control action. At the rear end of said piston 31 are two inwardly protruding lugs 35 supporting a pin 36. The described elements 30 to 36 inclusive turn rigidly together and may be considered as the intermediate element of this apparatus.

The connection between the intermediate element and the driven shaft is shown as a strong coil spring 37, the forward end of which is secured to the before mentioned pin 22 carried by the driven element, while the rear end of said spring 37 is secured to the pin 36 of the intermediate element. This spring forms a resilient connection in the nature of a reservoir of energy, since the rotation of the intermediate parts puts the spring under tension, thus storing energy, which is transmitted and drawn from the spring by the driven shaft, as the latter turns. The spring should be strong, yet of sufficient length so that several turns are possible, since in working at a heavy load the torque or rotary force to be transmitted to the driven shaft will be far greater than when the motor car is running light or on level ground.

I have thus described in succession the driving parts, the driven parts, the connections from the driving parts to the intermediate element, the intermediate element, and the resilient connection from the latter to the driven element or shaft.

It is clear that, but for the centrifugal weights 25 and 26, no rotation would be delivered from the driving to the intermediate element, as the planetary gears would simply turn idly by their engagement with the central gear. The action of the centrifugal weights alters this condition, since the weights tend to give alternate accelerations and retardations in the planetary gears, and therefore in the central gear. The action, however, is not positive or predetermined, but may be described as non-positive or yielding in nature. The intermediate element thus has this yielding connection from the driving parts, and also the resilient spring connecting it with the driven parts. In the present invention the action of the yielding connection between the driving and intermediate parts is dependent upon the speed at which the driving element or rather fly wheel rotates. At low speeds centrifugal force is negligible, and no power will be transmitted, but as speed increases, the centrifugal action becomes operative, and the transmitting action takes place. As this action transmits the torque through the intermediate element to the driven shaft, it is obvious that said torque may be controlled and regulated by merely controlling the speed of the driving element, in other words, the mere closing and opening of the usual engine throttle will control the speed and torque of the driven shaft.

The two abutments 33 and 34, already mentioned, travel around in the space between the cylindrical sleeve 32 and a stationary casing, having a concentric portion 40 and an extension 41. This space is in part annular, for about a half circumference, which is always engaged by one of the piston abutments. The balance of the casing is enlarged to contain certain other elements. The entire interior of the casing 40, 41, and indeed all adjacent and connecting spaces within the apparatus, are supposed to be filled with a suitable fluid, preferably a liquid, such as a light cylinder or machine oil, capable of active flow. Thus, the piston lugs travel around within the casing and force the oil ahead of them to flow through the channels later to be described.

Within the casing extension 41 are two longitudinal stationary members 42 and 43, serving as bearings for certain movable members to be described. These fixed bearing members are spaced about 90° apart. The bearing 42 is shown as enclosing within it a rotary vane or pass 44, and the bearing 43 has a similar vane or pass 45. Each of these members 44 and 45 is so shaped that in one portion of its rotation it contacts with the periphery of the piston sleeve 32, whereas in an opposite position it provides a passage or space for the travel of the piston lugs. Fig. 4 indicates the two positions, one for each of these members. In fact, one or the other of the vanes is always closed, that is, in contact with the sleeve 32, so that the liquid is unable merely to flow around adjacent to the sleeve, but must flow, if at all, through the control valves which are to be described.

A convenient way of actuating the rotary vanes 44 and 45 is as follows. Each of these at its axial extremity is provided with a pinion 46, and both of the pinions 46 engage a gear 47 mounted on the piston sleeve 31. These connections serve to rotate the two vanes in co-operation with the movements of the piston, so that each vane or pass opens for the passage of each piston lug, and thereafter closes. The pinions 46 are half the diameter of the gear 47, giving a two to one ratio, which is in conformity with the fact that there are two exterior lugs on the piston, and the vanes spaced 90° apart.

Without the controlling means or valves about to be described, the rotation of the piston might simply cause a free flow of the oil, which, although it cannot pass around adjacent to the piston sleeve, might pass outside the fixed bearing members 42 and 43. The passages outside these members, however, are controlled by rotary valves 48 and 49. Each of these is so arranged as to alternately engage or disengage the interior surface of the casing portion 41 and the bearing member 42 or 43. In Fig. 4 the valves are shown adjusted to such position that apparently all circumferential flow of oil is prevented, but owing to the construction of the valves, as will now be explained, this is not the case.

Each valve, shown in transverse cross-section in Fig. 4, consists of a curved portion 50 at one side of its periphery and a pivoted plate or fly 51, preferably swingable about the axis of the valve, as shown in longitudinal section in Fig. 9. Each valve at one end is formed with a circular plate 52, in the central aperture of which the fly 51 is pivoted by means of a stud 53. The other end of each valve is provided with a cylindrical member 54 extending longitudinally. It will be understood that the valve portions 50, 52 and 54 are composed of a single integral piece of metal forming the body of the valve, and upon which the movable fly 51 is mounted. In the interior of the portion 54 is located a circular stud 55, which is driven into operative engagement with the fly 51, so that by means of a coil spring 56 the valve fly may be normally maintained in the position shown in Fig. 4. By this arrangement the oil, pressed forwardly by the piston lugs, is capable of forcing open the fly of the valve, as is indicated in dotted lines at 51ª in Fig. 4, the spring 56 being of very light tension, but capable of restoring the valve to the normal position shown, when the oil pressure is released. At the outer end of the valve member 54 is secured a pinion 57, which is for the purpose of effecting rotary adjustment of the valve position, as will be later described.

It will be understood that the longitudinal ends of the bearing members 42 and 43 and of the rotary valves 48 and 49 are mounted in the end walls of the stationary casing extension 41. This casing at its forward end has an end wall 58, which closes the forward ends of the interior spaces, and is contacted by the ends of the piston abutments. The rear end of the casing has bolted to it a separate disk-like piece 59. Bolts 60 secure together the casing and the disk. The disk extends inwardly toward the driven shaft, where it is formed into a sleeve 61, loosely surrounding the shaft. It is by means of this sleeve that the casing 40, 41 is held in stationary condition. The sleeve 61 extends rearwardly to an exterior point, where it has keyed to it the hub 62 of an arm 63, which extends laterally to where it is secured by bolt 64 to a fixed frame part 12, thus firmly anchoring the stationary parts of the apparatus.

It remains to describe the actuation and connections for effecting control through the valves 48 and 49. As already stated, these are shown in Fig. 4 adjusted to the position they will occupy for full drive ahead of the motor vehicle or other machine. Each of the valves in this position is capable of permitting oil to flow counterclockwise through the stationary casing. It will be noticed that the fly 51 is of materially greater width at one side of its axis than at the other. The narrow side of the fly normally rests against a shoulder formed in the curved portion 50 of the valve, being lightly held there by the spring 56, but when in the operation of the machine the pressure upon the oil is applied to the face of the fly 51, it is caused to swing open and thus freely permit the travel of the oil, as mentioned. The dotted line position 51ª shows the yielded adjustment of the fly. At the same time it acts as a check valve, immediately closing upon any tendency of the rotary piston or of the oil to move in clockwise direction. Notwithstanding the light mounting of the valve fly and its ready ability to open, it will be noticed that the valve as a whole is concentrically mounted, and therefore is balanced in the sense that practically no force is required to turn it to its different adjustments.

Other adjustments of the valves are indicated in Figs. 6, 7 and 8. It will be understood that the two valves are always turned in unison so as to have the same adjustment. In Fig. 6 an adjustment is shown wherein the valve does not obstruct the flow of oil in either direction. When so adjusted the parts will be set in free condition, for example, for the purpose of turning or advancing the machine by hand. When the valves are set as indicated in Fig. 7, the flow of oil is positively obstructed in both directions, and, as will be explained more fully in describing the operation of my invention, this serves as a brake to effectively retard the motion in either direction of the driven parts. In Fig. 8 a fourth adjustment of the valve is shown. This is the reverse of the Fig. 4 adjustment, and is such as to permit the oil to flow only in a clockwise direction, which is the condition requisite for reverse driving of the machine. Further adjustments are possible. For example, by adjusting the valves to positions between the full speed position of Fig. 4 and the braking position of Fig. 7, the result will be obtained by which the machine may be set to be partly under drive and partly under brake, this giving the possibility of a certain control over the speed ratio.

Coming now to the manual control connections for adjusting the valves to the described positions, attention is first recalled to the pinions 57 at the extremities of the valve stems 54. The two pinions 57 are shown as both engaging with a gear 65. The hub 66 of the gear 65 is keyed to a sleeve 67, which surrounds the driven shaft and the sleeve 61 before mentioned. By rotating the sleeve 67 this turns the gear 65 and simultaneously and equally adjusts both of the valves 48 and 49. To effect such adjustments at will, the sleeve 67 is shown as extending to an exterior point where it has keyed to it the hub 68 of an arm 69. At the extremity of the arm 69 is connected by a ball and socket joint a link 70, the upper end of which is connected by a similar ball and socket joint with an arm 71, mounted on a transverse shaft 72, at a suitable point upon which is a pedal lever 73, provided with a pedal 74 at its extremity within reach of the operator. A spring 75 acting upon the shaft 72 tends to turn the same in a direction to throw the pedal toward the operator or rearwardly, and the pedal is so arranged that the operator by his foot may readily throw it forwardly. The four main positions of adjustment of the pedal 74 are indicated by dotted lines in Fig. 10. The position B, in which the pedal is shown, corresponds with the valve adjustment of Fig. 4, giving full forward drive. The position A corresponds with the valve adjustment of Fig. 6, in which the oil is released, and there is no drive or retarding in either direction. The position C corresponds with the valve adjustment of Fig. 7, in which rotation of the driven parts is retarded or prevented. Position D corresponds with Fig. 8, and when the pedal is in this position the valves are adjusted to give reverse drive.

In connection with the control lever or pedal 74 I have indicated a manual control lever or guard 76. The hand lever 76 is provided with a pair of stops, namely, a forward stop 77 and a rearward stop 78, in the form of pins standing in front of and to the rear of the foot lever, respectively. The hand lever itself is capable of three adjustments, and is shown in Fig. 10 in its normal or central adjustment. This is secured by means of a spring pin 79, mounted on the handle 76 and engaging a notch 80 in a fixed plate 81, mounted on a frame part 12. A latch handle 82 is provided for retracting the pin 79 from its notch to permit shifting adjustment of the hand lever.

With the central or normal adjustment of the hand lever shown in Fig. 10, the stop pins 77 and 78 are so positioned as to limit or guard the pedal 74 against movement excepting between positions B and C. The pedal spring 75 under these circumstances holds the pedal in position B, in which the control valves are adjusted for full speed ahead. When running a motor car, for example, with the apparatus in this condition, the pedal may remain in position B, the drive of the car being controlled solely through the throttle; but if power is to be thrown off and brake applied, the operator need only thrust forwardly the pedal from position B to position C. The stop pin 77 guards against his overthrowing the pedal to reverse position. As before stated, the pedal may be manipulated to intermediate positions between B and C to give progressive regulation of driving and braking action to a certain extent, and the possibility of this regulation is one of the merits of the present invention.

When it is desired to reverse the motor car or other machine, it is only necessary for the operator to throw the handle 76 forwardly, shifting the pin 79 from the central notch 80 to a forward notch 83. In making this shift the pedal is carried from position B to position C, in which latter the braking action is put into effect. The operator may now with his foot thrust the pedal further forward, namely, from position C to position D, thus bringing about a reverse drive of the machine. By manipulation of the pedal between positions C and D, the operations of reverse driving and braking may be put more or less into effect, so as to give regulation of the reverse speed.

If, on the other hand, it is desired to release the driven parts from operative connection with the driving parts, namely, by adjustment of the valves to the position of Fig. 6, it is only necessary to shift the hand lever 76 from the central position shown in Fig. 10 to a rearward position, in which the pin 79 will be engaged in a rear notch 84. As this adjustment is made, the pedal spring 75 pulls rearwardly on the pedal and brings it to position A, which was the result desired.

The interior of the casing 40, 41 may be initially filled with a suitable liquid such as the oil mentioned, and may be maintained full by any desired means. I have shown a device tending to automatically force oil into the interior of the casing. It is understood that the apparatus as a whole is substantially full of oil, so that the annular space within the cover plate 15 and exterior to the casing is substantially full of oil. As the fly wheel and cover plate rotate in a counterclockwise direction, looking at Fig. 4, these parts, indicated in dotted lines at 15ª, will tend to maintain a circumferential flow of oil. This oil flow will strike with some force against a yielding valve 85, mounted in a projecting extension 86 of the casing, so that at every possible opportunity for the admission of oil, a certain amount will tend to creep in through the valve, and therefrom through aperture 87 into the annular space within, the valve returning to its seat and thus preventing outflow. With such an arrangement leakage is replaced and the casing maintained full of oil, as is preferable for its best efficiency of operation.

Although this invention may be used for the driving of machines other than motor vehicles, I shall in the following explanation restrict the description to the assumed case of a motor vehicle propelled by internal combustion engine. The problems of transmission from the engine to the wheels in a motor vehicle are due mainly to the fact that the internal combustion or gasoline engine runs at its best efficiency at relatively high speeds and becomes so inefficient at lower speeds, due to the reduction in the number of explosions, that for practical purposes the engine is incapable of driving. For purposes of explanation it may be stated that with some engines and cars a minimum engine speed would be 150 R. P. M. It will be understood that at this speed the engine might effectively drive under easy road conditions, but under more difficult conditions a far higher speed would be necessary, and we may set a figure of 1000 R. P. M. as an average efficient engine running speed for motor vehicle purposes; although frequently the engine speed might be double this amount. For the purposes of further explanation we may designate the two speeds mentioned as low speed and high speed respectively, by high speed meaning anything from a thousand to two thousand, these figures being understood to be merely approximate and for the purpose of affording an instance for explanation. At the lower speeds of the engine it will be perceived that the engine is unable to deliver any suitable amount of energy or torque, whereas in practice it is frequently necessary to operate the motor vehicle at a quite slow speed, for instance three or four miles per hour, which roughly may be considered to correspond with the low engine speed above mentioned. One of the main problems, therefore, of a motor vehicle transmission is to enable low speeds of driven shaft rotation while the engine is operating at high speed, and another problem is to permit a speed ratio such that a torque or force will be delivered to the driven parts far in excess of that delivered by the engine and driving parts. The first condition permits vehicle operation under ordinary conditions at extremely low speeds, and the second enables the vehicle to surmount excessive loads, such as that imposed by a steep ascent. In the most generally used variable speed transmissions of the present day a gear shifting operation is employed, the operator being provided with control levers through which he is able to change the speed ratio in a step-by-step manner, usually requiring clutch disengagement, readjustment of gearing, and clutch re-engagement, while cooperatively manipulating the engine throttle. The shortcomings of this type of transmission are so numerous and well known that I do not herein take the space to explain the same. I am aware that attempts have been made by many inventors and patentees to obviate a step-by-step gear shifting action in a variable speed transmission, but so far as I am aware, none of these has proved satisfactory, so that the condition of the art as regards this problem may still be considered as experimental.

The present invention is believed to be novel in many aspects. The method or mode of operation followed in this variable speed transmitting apparatus is believed to be wholly new, and although I have herein shown a complete mechanism with many mechanical features of preference and detail, the underlying principles are considerably broader than the particular mechanism shown, so that I desire to claim many features of combination and subcombination illustrated by the drawings hereof, irrespective of the precise mechanism shown. For example, the connections between the driving member and the intermediate element of the mechanism is shown as comprising planetating disks or gears carrying and influenced by centrifugally operating weights. These instruments may be considered as constituting a yielding or non-positive connection. I have devised a different embodiment of the present invention, in which in the connections referred to the centrifugal weights are replaced by springs capable of being put under varying degrees of tension. In either case the connection referred to, whether operated by a weight or spring, is so arranged, according to the principles of the present invention, as alternately to urge forward the driven member, and then to urge forward the driving member, thus restoring energy or torque to the driving parts, the connections having means in the nature of a pawl and ratchet, or the equivalent thereof, for preventing the driven member from rotating reversely when not being urged forward. The effect of the non-positive or yielding action referred to is variable, so as to vary by decreasing or increasing the driving ratio, this variability, as already explained, being semi-automatic, the operator having a certain control over it by adjustment, and thereafter the effect being automatically variable as the transmission adapts itself to road conditions. Another instance of change of mechanism without departing from the underlying principles of the present invention is in regard to the means for preventing the driven member rotating reversely at those phases or parts of the cycle of action when it is not being urged forward. A purely mechanical device for this purpose in the nature of a pawl and ratchet might be used, and I have devised embodiments of that nature, but I prefer what may be termed a hydraulic pawl and ratchet, and have herein shown connections serving this purpose. Instead of having the non-positive or yielding connections operate directly upon the driven shaft, as might in some cases be done, I prefer, as already explained, to introduce an elastic element, namely, the reservoir spring 37, between the rotary driven shaft and the so-called intermediate rotating member, which latter is actuated through the non-positive or yielding connection and delivers the energy through the reservoir spring to the driven shaft. When such a reservoir or spring is omitted, the so-called intermediate rotating member becomes in effect the driven member or part of the same.

I desire now to afford a more complete and clear explanation of the action of my invention to the end that skilled constructors working from the drawings hereof will be better able to construct an embodiment of the invention. In stating the action, which from some points of view is rather difficult to appreciate, I will in some cases state my theory as to the actions and resulting reactions in the mechanism, but I do not wish to limit myself thereto, as analytical tests may show that the actual operations are somewhat different from my explanation thereof. In the following explanation I will first describe the actions that will take place when driving what may be termed full speed ahead, that is, when the foot pedal is adjusted to the B position, the control valves in the Fig. 4 position and the other parts as indicated in Fig. 3. Subsequently and separately I will describe the action when driving reversely, and thereafter the braking action.

Coming first to forward driving, with the valves adjusted as in Fig. 4, I will first ignore entirely the possibility of regulation by manipulating the pedal between positions B and C, and confine the description to the assumption of control by the engine throttle. On Fig. 4 the arrows show the directions of rotation of the parts. Everything here that rotates has a counterclockwise motion, although the planetating gears and centrifugal weights may at times come to rest or be slightly readjusted in a reverse direction, although this would only take place when driving at substantially unit ratio.

To avoid confusion, I will explain briefly the centrifugal forces that exist in the system during the operation. The weight 27 on the planetating gear 26 is marked with a star indicating the center of gravity of the weight. As with any planetating body, the weight has two sorts of motion. First, it revolves with the fly wheel about the axis of the entire apparatus, and, second, it rotates about the stud 16 of the planetating gear. The first motion, namely, the rotation around the axis of the apparatus, that is, around the driving or driven shaft, produces in each weight 27 a centrifugal force tending to throw the weight outward toward the periphery of the fly wheel. This is the active centrifugal force that gives the operative results of the present invention. The play of the weight inwardly and outwardly while under the influence of this force is its rotation around the stud 16 of the planetating gear. Such rotation about the stud produces a centrifugal force in each weight 27, but this acts only directly on the stud 16, and the only effect thereof is a negligible tendency to accelerate or retard the fly wheel itself, which as a whole is of much greater weight than the weight 27. This latter centrifugal force produces no effect that is transmissible to the driven parts, and therefore hereinafter it will be ignored, and the centrifugal force to be referred to is the first mentioned, namely, the tendency to throw each weight toward the periphery of the fly wheel. On Fig. 4 I have diagrammatically laid out a series of radii $a, b, c, d, e, f$, with the stud 16 as a center, to designate different positions of the center of gravity of the weight 27 for the purposes of description. The tendency of the centrifugal force referred to is always towards bringing the weight to position $a$, but in action it will seldom stand in that position, except momentarily. The weight is now shown with its center of gravity in position $b$. Under different conditions it might be shifted to position $c$ or $d$, and when driving at less than unit ratio it might be carried around inwardly to position $f$, after which it will pass to the opposite side, so as to reverse the effect or result of the centrifugal force, which up to this point would tend to rotate the planetating gear clockwise, but after passing this point would tend to rotate it counterclockwise.

As before stated, when driving ahead at unit ratio, there is practically little or no play of the rotary parts of the present invention. This condition will frequently occur in practice, it being dependent on the resistance presented by road conditions and the adjustment of the engine throttle.

In this statement and throughout the present description it is assumed that the apparatus is running at what has heretofore been defined as high speed or approximately that, since at the lower speeds the centrifugal force developed in the weights 27 is ineffectively small, and indeed at a very slow speed the centrifugal forces will be so negligible as to be practically non-existent, therefore giving no operative effect for transmission purposes.

The condition of the interior mechanism during the unit ratio forward drive referred to may be substantially as follows. The weights 27 may be at the position b, remaining substantially there; or they may be at the position c, or in fact at substantially any position between a and d, this being dependent upon the torque or driving force required by the driven shaft, which is dependent upon the road conditions. As road conditions change slightly, it is possible for the weights to slightly readjust their position, so as automatically to maintain unit ratio. In any case there will be maintained within the system a sort of balance of forces, one offsetting the other so as to preclude rotation of the disks and weights. The one force is the rotary effort or torque tending to rotate the disk 25 or 26 clockwise, resulting from the centrifugal force of the weight 27. This will vary in accordance with the position of the weight. It is quite moderate at position b, and will be maximum at about position d. The balancing force or torque is that of the driven parts, or rather of the intermediate parts, including the central gear 30, which is being urged clockwise by the reservoir spring. When driving at unit ratio these two balance and the planetating gears cease rotating on their studs, their only motion being that of revolution about the driven shaft. The result of this action, which eliminates rotation of the planetating gears, is that these gears and the central gear form a practically locked or unitary system having unchanging relation to the fly wheel, except for the slight play or readjustment between positions a and d already mentioned, so that in their entirety they rotate with the fly wheel, thus communicating drive at unit ratio to the central gear, and therefrom through the reservoir to the driven shaft.

It should be explained that Figs. 3 and 4 do not show the valves 48 and 49 in the position they will occupy during unit speed forward drive. The dotted line position 51ᵃ of the fly of the valve 49 indicates the effect of the continuous peripheral oil flow. Both of the valves remain open in this sense, or at least one of them, so that there is no substantial resistance to the flow of oil. Indeed, during unity forward drive the valves might be adjusted to the Fig. 6 position, or any other position permitting free counterclockwise oil flow.

One advantage of the present invention is the ability to start the motor vehicle into motion with great ease of action. With the valve set in the forward driving position of Figs. 3 and 4, the engine will be started at low speed and the throttle gradually opened. At the lower speeds the centrifugal force of the weights 27 is insufficient to be operative, but as the engine gradually speeds up, the centrifugal force becomes of greater and greater extent until the point is reached where the alternate forward and rearward centrifugal actions on the planetating gears will come into play to advance the intermediate gear 30. If the vehicle be imagined as standing on an uphill slant, or with the front wheels against a low shoulder or curb, the result will be that the car will remain stationary until the increased torque of the engine, controlled through the action of the centrifugal weights, will operate upon the central gear 30 to gradually start the gear into motion, the car thereafter speeding up in accordance with the throttle control. As the speed increases from this point up to unity ratio, we have the conditions for which the present invention was primarily designed, namely, to permit the driving of the vehicle at a ratio less than unity, and I will now describe the actions and interactions of the parts under such conditions.

The cycle of actions with less than unity drive, as pictured in Figs. 3 and 4, may be substantially as follows. The cycle may be divided into two parts or phases by reason of the fact that during substantially a half rotation of the disks 25 and 26 in the direction of the arrows, the rotation is being resisted by the centrifugal weights, whereas, after the center of gravity of each weight passes the most inward point of its travel or substantially there, the action of the centrifugal forces is reversed, giving the second phase, in which the outward tendency of the weights reinforces the counterclockwise rotation of the planetating disks. Fig. 4 shows the weights 27 having just entered into the first phase. The flies of valves 48 and 49 have not yet opened, indicating that the centrifugal forces have not yet overcome the reverse torque or resistance of the central gear, which is being twisted clockwise by the reservior spring. For the moment, therefore, the central gear 30 may be considered as stationary, and the planetary gears therefore, as they are carried around by the fly wheel, are caused to rotate, thus causing the centrifugal weights to be pulled centripetally in opposition to their centrifugal tendency. When the center of gravity of each weight reaches a position somewhere between the position $b$ and the position $d$, the resulting increase of centrifugal force will first equalize, and then exceed, the torque or resistance of the central gear. When this point is reached, the central gear, and therefore the rotary piston, will be urged forward and will actually advance, thus tensioning and delivering energy into the spring. Up to this point, it is to be understood, the valves 48 and 49 having been closed effectively prevented any reverse rotation of the piston and central gear. The valve devices have acted as a stationary hydraulic pawl and ratchet. When the critical position of the weights 27 was reached, however, giving an excess of centrifugal forces, the piston was urged forwardly or counterclockwise, forcing the oil around through the casing in the same direction, and the valves 48 and 49 opening, as indicated at 51ª, so as to permit free peripheral oil flow and avoid any resistance to the forward drive of the central gear and driven parts. This forward driving action will continue until the weights 27 pass what may be termed a neutral position near the position $f$, but perhaps more nearly the position $e$, owing to the counter effect of the spring. After this point and the point $f$ are passed, the weights enter the second phase of the cycle of action.

In the second phase or action the centrifugal force of the weights 27 works in the same rotative direction upon the planetating disks as that imparted to them by the travel of the fly wheel. It will be understood that during this phase a tendency is created to rotate the central gear and driven parts clockwise, but the valves 48 and 49 will have automatically closed, as indicated in Fig. 4, so that oil flow is prevented, and throughout this phase the central gear is stationary. The result of this condition is that the centrifugal weights, creating rotary effort in a counterclockwise direction on the gear 25 and 26, will through their studs 16 tend to urge forwardly the fly wheel and driving parts. In a sense the surplus energy received in the first phase and not delivered to the driven parts, is thus effectively returned to the driving parts, and is not lost. This condition continues until the weights 27, passing the outermost point $a$, again arrive at a critical point between $b$ and $d$ where the centrifugal force by its action upon the gears overcomes the resistance of the central gear and again urges forwardly the driven parts. This alternation of phase through cycle after cycle continues, as before stated, without causing appreciable vibration and without substantial loss of energy.

The function of the spring 37 between the intermediate gear 30 and the driven parts will now be better understood. The intermediate parts are alternately anchored or held by the hydraulic pawl and ratchet and driven forwardly through the centrifugally controlled gears 25 and 26. The spring serves as an equalizer. It is constantly under a stress, which will be more or less dependent on the road conditions and the torque or resistance offered by the driven parts. In each cycle of action the reservoir will be operated at the driving end to strain the spring and store energy therein, while the driven parts at the other end of the spring will draw upon it for the required energy to drive the vehicle, the resulting driving speed therefore being practically uniform. Without such a contrivance the action of my invention would be inferior, although operative. The spring may be a resilient element of any type and in any location between the intermediate parts and the vehicle wheels.

In further explanation of the operation of the mechanism under practical conditions the following considerations are important. It has been said that one of the main requirements of a transmission is to be able to drive the driven shaft at a reduced speed, considerably less than that of the driving shaft, and it will be seen that this has herein been accomplished in a way that enables control simply through opening and closing the engine throttle or operating the same in conjunction with the spark. From the operator's standpoint it is only necessary to manipulate the throttle to bring the vehicle to any desired speed under any existing conditions, and thereafter the adjustment of speed ratio and the resulting torque in the driven parts is purely automatic and self-acting. Changes of speed ratio with my invention are possible over a considerable range, with continuous adjustment or variation between the higher and lower limits, rather than a step-by-step adjustment, as heretofore generally used. To show the range of speed ratio, I call attention that the turning moment which may be imparted to the driven shaft is directly proportional to the centrifugal force acting upon the weights 37. This force is proportional to the square of the speed of the fly wheel. Doubling the engine speed quadruples the centrifugal action. In this way the delivered torque may be directly controlled by the speed of the engine. With the speeds before mentioned, 1000 R. P. M. and 150 R. P. M., it would follow that the delivered torque would be 45 times greater at 1000 R. P. M. than at 150 R. P. M. This enables adjustment to meet the most varying conditions, and is all performed simply by manipulation of the throttle.

The spring will be maintained under a fairly uniform tension owing to the fact that energy transmission to the spring will occur during the major part of the action. The rotation of the planetating gears through their effective period, that is, the period in which they are rotating forward the intermediate gear 30, is relatively slow and may continue over many fly wheel rotations, and during the whole of this time driving energy will be transmitted to the spring. The only periods in which energy is not being transmitted is through the second phase of action of the centrifugal weights, and for a slight additional period until they reach their critical or operative point; and the passing of the weights through such periods must be relatively rapid and takes place during about a half rotation of the fly wheel. In other words, the torque transmitting action is continuous with the exception of the occasional short periods of suspension of action, during which the intermediate parts are anchored and the centrifugal elements are quickly readjusting themselves for further transmitting action. It is true that with a very low speed ratio, such as 45 to 1, the brief suspensions of transmission will occur quite frequently, perhaps once in something over one rotation, but even in that case the periods of operative transmission occur at least once in every rotation, thus maintaining the transmission of torque to the spring; and with higher speed ratios, for example 5 to 4, the occasional suspension of transmission may occur but once in four or five fly wheel rotations. When the ratio rises to unit the occasional suspensions of drive are wholly eliminated, and, as before stated, the entire system rotates together as a unitary structure.

To better explain the automatic readjusting action of the present invention under practical road conditions, we will take a definite example such as a vehicle running about twenty-five miles per hour on a level road, with the engine at about 1000 R. P. M., and developing sufficient torque to turn the driven shaft on a 1 to 1 ratio. Under these conditions the centrifugal forces of the weights 27 is more than sufficiently great to deliver the torque required by the driven shaft, without drawing the weights toward the center. The planetating gears do not now revolve, and the mechanism turns as a unit, giving the equivalent of the so-called direct drive.

The vehicle now coming to a considerable upgrade such that the developed torque in the engine is not sufficient to turn the driven shaft and propel the vehicle without the alteration of speed ratio, the engine consequently starts or tends to slow down. The result of decreased engine speed is to decrease the centrifugal force of the weights 27 in proportion to the square of the speeds. This reduces the resistance of the planetating disks to being rotated counter-clockwise, and as a consequence such rotation takes place and the weights are drawn inwardly. This immediately relieves to a certain extent the load on the engine, and, as the weights pass their inner neutral position, they enter the second phase of action and operate to deliver to the fly wheel or engine a forward impulse. This enables the engine to again speed up, thus increasing its efficiency, and since, moreover, energy impulses are being delivered by the centrifugal force to the fly wheel, the torque of the driven shaft or engine will be increased. As the described readjustment takes place, the speed of the driven shaft has become reduced in inverse proportion to the increase of torque. In consequence of these actions a condition of balance between the driving and driven shafts will be automatically reached, and under the readjusted conditions, the vehicle going uphill, the engine will turn with greater torque, delivering the greater energy to the driven shaft, but at a lower speed ratio. As the vehicle approaches the crest of the grade where the torque requirement is reduced, a resulting readjustment will take place by reason of the planetating gears turning more and more slowly, due to the reduction of force required to turn the spring and driven shaft. As soon as the centrifugal force of the weights counterbalances the force requisite to turn the central gear and drive the vehicle, the planetating gears may again cease to rotate, the mechanism coming again to unity ratio.

From the above explanations it will further be obvious that it is impossible with my invention to accidentally stall the engine, this being due to the fact that, as the speed is reduced, the torque to be delivered by the engine is reduced in proportion to the square of the speed.

When the car comes to a down grade, and power from the engine is no longer required, the first action will be a tendency of the engine to race, upon which it is merely necessary to shut down the engine throttle. The pedal and hand lever do not require manipulation. The vehicle is practically free running, and the rotary piston will operate to cause a forward circulation of oil, which, owing to the adjustment of the valves as in Fig. 4, is not resisted.

Thus, it is seen that for all conditions of forward driving the speed of the vehicle may be controlled by merely regulating the engine throttle, the torque required by the driven shaft being automatically adjusted to meet the requirements, and this being accomplished without the necessity of any manipulation of the pedal or hand lever.

With this invention it is possible, and in some cases might be desirable, to control forward driving without the use of the throttle or independently of the throttle. Assuming the throttle in a fixed adjustment, a speed regulation may be effected by manipulating the pedal 74 between its positions B and C. In position B the valves are adjusted as in Fig. 4, giving full forward drive, while in position C the valves are adjusted as in Fig. 7, where the prevention of circulation operates to bring the car to a stop. By manipulating the pedal between these positions, the rate of liquid flow and the resistance offered by the liquid may be varied progressively so that the speed of the vehicle may be regulated between full speed and zero.

For the purpose of reversely driving the vehicle, the hand lever has first to be shifted to its forward position and the pedal 74 then thrown into position D, thus adjusting the control valve to the position of Fig. 8, in which the flies 51 are reversed, thus permitting the oil to flow clockwise, the opposite to its direction when forward driving. The resulting actions are analogous to those in forward driving, but with the reversed valve adjustment the hydraulic pawl and ratchet operates reversely, preventing any forward rotation of the driven parts and central gear 30, and freely permitting reverse rotation. As the centrifugal weights planetate they will in their first phase swing rapidly inward through positions c, d, and e to position f, the central gear at this time being anchored against being rotated by the planetating gears. As the weights pass the position f into the second phase, the centrifugal force will accelerate the rotation of the gears 25 and 26 to such a point that the central gear is urged and thrust clockwise, thus giving reverse drive to the vehicle. The speed ratio will be low, inasmuch as the action by the planetating gears upon the central gear is a differential one, depending on the excess of rotary speed of the planetating gears over that of the fly wheel. The reverse speed, moreover, may be controlled through regulation of the engine throttle.

The braking operation of the present invention secured by the valve adjustment of Fig. 7 is very advantageous for several reasons. This dispenses with the ordinary foot brake of a motor vehicle. It may be applied gradually to avoid abrupt stoppage and injury to the parts, and the control is entirely through the same foot pedal used for forward driving. Moreover, since the braking action is not through the pressure of the operator's foot, but through the hydraulic resistance to the turning of the driven parts, the operator is relieved from the necessity of applying substantial force, and a very light pressure on the pedal will suffice. The parts of the braking device run in oil and are not subject to wear, as with the usual brake.

Having completed the description of the mechanism and operation, the invention may be reviewed. It meets all of the requirements and problems heretofore stated, pertaining to variable speed transmission. It will act to give any desired speed ratio between the driving and driven shafts, and either forwardly or reversely. The ratio is easily controlled by the mere opening and closing of the usual throttle, without any manipulation of other levers. When the torque required by the driven shaft exceeds that developed by the engine, owing to changes of road conditions, the mechanism adjusts itself automatically, and thus relieves the operator from the mental strain usual in motor vehicle operation. The operation of free running or coasting is practically automatic, requiring nothing but the closing of the throttle, which is performed naturally to prevent engine racing. It is impossible under any conditions to stall the engine. The foot control pedal may be set in a release position to allow the vehicle to be moved by hand in either direction, and finally braking may be accomplished to progressive extents by the mere moving of the foot control pedal. This pedal, therefore, may be considered as taking the place of the ordinary foot brake, the foot clutch and the change gear lever of the usual motor vehicle transmission.

It will thus be seen that I have described a variable speed transmission embodying the principles and attaining the objects and advantages of the present invention. Since many matters of construction, combination, arrangement and detail may be variously modified without departing from the novel principles of the invention, it is not intended to limit the invention to such matters except in so far as specified in the appended claims.

What is claimed is:

1. In combination, a driving member, an intermediate member actuated from the driving member, and a driven member actuated from the intermediate member, the intermediate member comprising a rotatable piston, a stationary cylinder co-operating with said piston, a liquid connection between said piston and cylinder, and means for holding said liquid against rotation in one direction and permitting it in the other.

2. A mechanical power transmission apparatus comprising in combination, the rotating driving member, the rotatable driven member, a centrifugally pulled planetating weight mounted on the driving member, a rotatable intermediate member, connections from the planetating weight to the intermediate member such that the centrifugal force of the planetating weight causes alternate reverse thrusts upon the intermediate member, a stationary member, a hydraulic one-way device between the stationary and intermediate members, means for controlling at will the rate and direction of liquid flow therein, and a resilient connection between the intermediate and driven members.

3. In combination, a driving member, a driven member, and variable speed transmission connections between the two, the same comprising an intermediate rotatable member, connections actuated by the driving part for rotating said intermediate member intermittently during certain speed ratios, and a liquid device for controlling the actuation of said intermediate member, said liquid device comprising a stationary member between which and the intermediate member a liquid may flow, together with valve means adjustable at will to determine the extent and direction of liquid flow.

4. In combination, a driving member, a driven member, and variable speed transmission connections between the two, the same comprising an intermediate rotatable member, connections actuated by the driving part for rotating said intermediate member intermittently during certain speed ratios, and a liquid device for controlling the actuation of said intermediate member, said liquid device comprising a stationary member between which and the intermediate member the liquid may flow, together with valve means adjustable at will to determine the extent and direction of liquid flow, such that in one adjustment the liquid and intermediate member may rotate only forwardly and not reversely, in a second adjustment the same may rotate reversely but not forwardly, in a third adjustment the same are held against rotation in either direction, and in a fourth adjustment the same are freely rotatable in either direction.

5. In transmission apparatus the combination, with the rotary driving and driven members, of transmitting mechanism adjustable for forward and reverse driving and braking, and a control lever having adjusting connections to said mechanism, such that the first lever position gives forward drive adjustment, its second position braking adjustment, and its third position, beyond the second position, reverse drive adjustment, said control lever having associated with it a second lever, the latter having stops for the first lever arranged to limit the adjustments to forward and brake, said second lever, however, adapted to be shifted to bring the first to brake, and permit its shifting therefrom to reverse.

6. In transmission apparatus the combination, with the rotary driving and driven members, of transmitting mechanism adjustable for forward and reverse driving, releasing and braking, and a control lever having adjusting connections to said mechanism, such that the first lever position gives forward drive adjustment, its second position braking adjustment, and its third position, beyond the second position, reverse drive adjustment, and a fourth position, short of forward position, for release.

7. Transmission apparatus as in claim 6 and wherein a second lever is associated with the first lever and has stops therefor, arranged to limit the adjustments to forward and brake, said second lever, however, adapted to be shifted to bring the first to brake, and permit its shifting therefrom to reverse, or to bring the first lever to release, and permit its shifting, between said stops, to forward position.

8. A variable speed transmission apparatus comprising in combination, a rotating driving member, a yielding and reasserting device carried on said driving member, a rotatable intermediate member, a train of connections, between said device and the intermediate member, including a one-way device controlling the same, whereby rotation is transmitted through said first device, in one direction only, to the intermediate member, a driven shaft, and a spring between the intermediate member and driven shaft; said elements being assembled concentrically, the driven shaft within the spring, the intermediate member surrounding the spring, and the driving member enclosing the three.

9. A variable speed transmission apparatus comprising in combination, a rotating flywheel of hollow construction, a yielding and reasserting device carried by the flywheel, a rotatable sleeve concentrically within the flywheel, a train of connections, between said device and the sleeve, including a one-way device controlling the same, whereby rotation is transmitted through said first device, in one direction only, to the sleeve, a helical spring concentrically within said sleeve, and a driven shaft within said spring, said spring connected at one point to the sleeve and at another point to the driven shaft.

In testimony whereof, I have affixed my signature hereto.

JOHN REECE.